June 21, 1938.                R. F. BEAN                2,121,622
                            JUICE EXTRACTOR
                          Filed Nov. 6, 1936

Inventor:
Robert F. Bean,
by Harry E. Dunham
His Attorney.

Patented June 21, 1938

2,121,622

UNITED STATES PATENT OFFICE 2,121,622

JUICE EXTRACTOR

Robert F. Bean, Bridgeport, Conn., assignor to General Electric Company, a corporation of New York Application November 6, 1936, Serial No. 109,431

6 Claims. (Cl. 146—3)

This invention relates to juice extractors, more particularly to devices of this character for extracting the juices from citrous fruits, such as oranges, lemons, grapefruit, limes and the like, and it has for its object the provision of an improved extractor of this character.

While not limited thereto, this invention is particularly applicable to fruit juice extractors having a power driven reamer which acts on the fruit held against it to break down the pulp and remove the juices. More specifically, this invention relates to extractors of this character having a rotary reamer mounted in a juice collecting bowl, and having a fruit holder adapted to support the fruit, and to move it from a retracted position into extracting relation with the reamer, and it contemplates an improved organization of parts in a juice extractor of this type.

Figure 1:
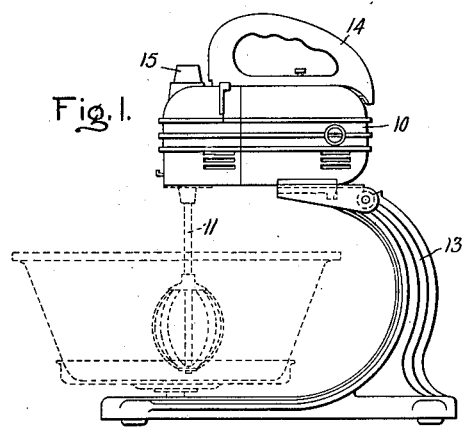
Figure 3:
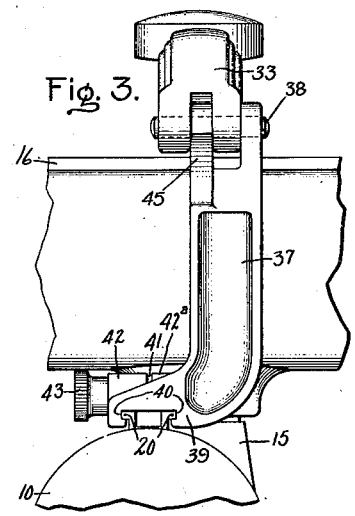
Figure 2:
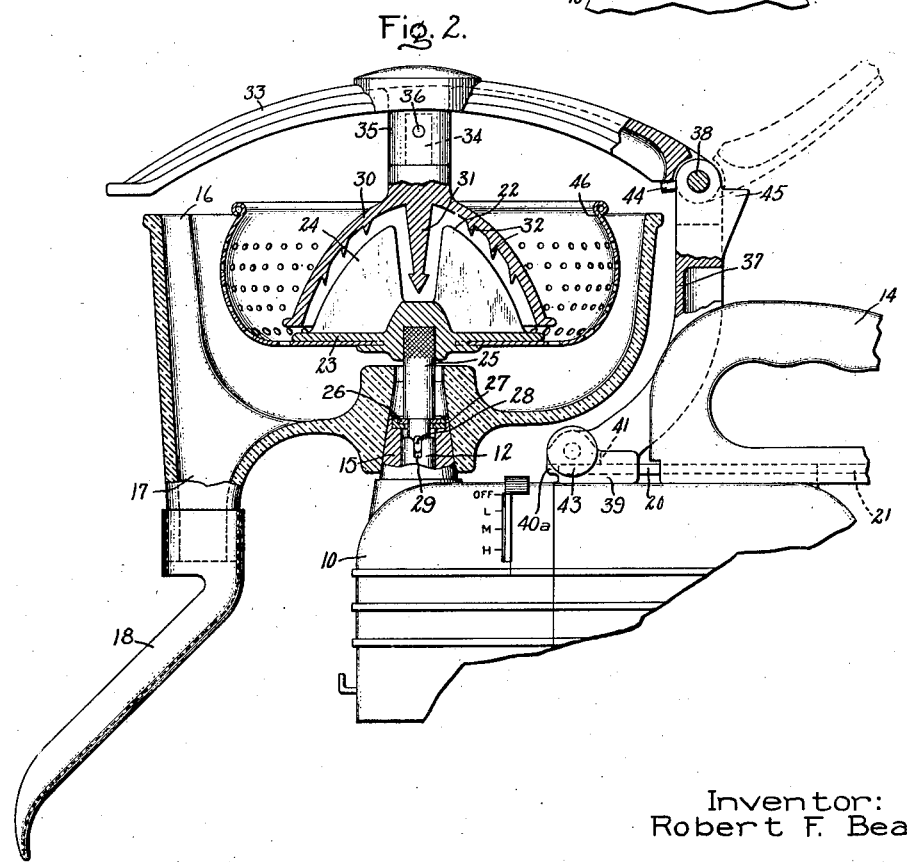

For a more complete understanding of this invention, reference should be had to the accompanying drawing in which Fig. 1 is an elevation of a power unit arranged to operate the juice extracting device of this invention; Fig. 2 is an enlarged fragmentary elevation of the juice extracting device arranged in accordance with this invention, parts being shown in section so as to illustrate certain details of construction; and Fig. 3 is a fragmentary end elevation of the juice extracting device of Fig. 2.

Referring to the drawing, this invention has been shown as applied to a juice extracting device intended to be used as an auxiliary unit with the food mixing device described and claimed in the U. S. Patent No. 2,103,928, granted to me on December 28, 1937. It is to be understood, however, that my juice extracting device is not limited in its application to mixing devices of this character, but that it may be a separate unit complete in itself.

As shown in Fig. 1, the mixing device referred to above, and which is used to drive the juice extractor of this invention, comprises a power unit 10 consisting of an electric motor arranged to drive a suitable beating tool 11 through suitable gearing (not shown). The power unit 10 is also arranged to drive a suitable shaft 12 (Fig. 2) accessible at the top of the unit. This shaft is arranged to drive my juice extracting device. The power unit 10 is mounted on a standard 13 and is provided with an operating handle 14.

The shaft 12 extends upwardly through a suitable protuberance 15 having the shape of a frustrum of a cone. Preferably and as shown, the protuberance will be arranged on one side and at the front of the power unit. Mounted on this protuberance 15 is a juice extracting bowl 16 which is provided with a depending discharge spout 17, preferably, the bowl and spout will be formed of glass. Mounted on the lower end of the spout 17 is a discharge chute or conduit 18 formed of any suitable metal and secured to the spout in any suitable manner. As pointed out more fully in the above-mentioned patent, the handle 14 is movable from its working position shown in Fig. 1 to a retracted position shown in Fig. 2 to provide room for the bowl 16 on top of the power unit. For this purpose, the handle 14 has a dove-tail connection with the power unit. The dove-tail connection comprises a pair of outwardly extending flanges 20 on top of the power unit spaced apart from each other in substantially parallel relation. The handle 14 is provided with a pair of spaced channels 21 arranged to receive the flanges 20, the channel thereby being mounted for reciprocating movement on the power unit.

Mounted for rotary motion within the bowl 16 is a juice extracting reamer 22. The reamer 22 has a base 23 and a plurality of extracting blades 24 mounted on the base. Extending downwardly from the base 23 is a shaft 25 having a thrust bearing 26 resting in a journal 27 provided for it in the protuberance 15. The shaft, as shown, extends downwardly through the juice extracting bowl and on its lower end is provided with a tooth 28 arranged to be received in a slot 29 provided for it in the upper end of the shaft 12 to effect a driving connection between the shafts. Preferably, two teeth 28 and two slots 29 will be provided on opposite sides of the two shafts 25 and 12 respectively.

A cup-shaped fruit holder 30 is provided to support the fruit and to move it into extracting relation with the extractor 22. The fruit holder 30 has in general the shape of the contour of the extractor 22 and both of these members have in general the shape of a half citrous fruit, as clearly shown in Fig. 2. The holder 30 is provided with a large central impaling tooth 31 and a plurality of impaling teeth 32 spaced at intervals in the cup. The impaling teeth 31 and 32 function to secure the half fruit to the cup and to prevent it turning relative to the cup.

The holder 30 is mounted on an operating arm 33. For this purpose, the holder is provided with an extension 34 extending into a recess provided for it in a member 35 which in turn is supported directly by the arm 33. The member 34 is secured to the member 35 by a pin 36 passing through these members.

The operating arm 33 is supported by means of a standard 37; and is pivotally connected to the upper end of the standard by means of a shaft or pin 38 for movement from a retracted position shown in dotted lines in Fig. 2 to a working position shown in full lines in the figure.

The standard 37 is arranged to have at its lower end a dove-tail connection with the flanges 20 provided on the power unit when the handle 14 is moved to its retracted position. As shown, the standard 37 is provided at its lower end with a bearing or base member 39 which is provided with oppositely arranged parallel channels 40 spaced apart so as to be slid or moved onto the flanges 20 on the power unit. Thus, when the handle 14 is in its retracted position, shown in Fig. 2, the base member 39 may be slid on the flanges 20. The channels 40 on base member 39 are closed at their ends 40a to stop against the flanges 20, thereby positioning the fruit holder 30 in working relation with the extractor 22 longitudinally. The standard, as shown in Fig. 3, curves away from the base toward the right, as viewed in this figure, so as to bring the arm 33 and fruit holder over the protuberance 15.

The base 39 is provided with a cut 41, such as a saw cut, which divides the base into two parts 42 and 42a to define a clamping device. The two parts of the clamping device are moved together to clamp the base and standard to the flanges 20 by means of a set screw 43 which is directed through an aperture provided for it in the part 42 and received in threaded engagement in the part 42a. Thus, to lock the standard to the power unit it is merely necessary to turn the screw 43 inwardly to move the parts 42 and 42a into clamping relation with the flanges. To release the standard, it is merely necessary to unscrew the member 43 whereby the members 42 and 42a spring apart due to the natural resiliency of the metal of which they are formed.

The standard 37 at its upper end is provided with a stop 44 to limit the movement of the arm 33 in a working direction, that is, in a direction to move the fruit into extracting relation with the reamer 22, and is provided with a second stop 45 defining the retracted position of the arm.

Preferably, a suitable centrifugal strainer 46 will be secured to the reamer, as shown in Fig. 2 to strain from the extracted juices the seeds, and the heavy pieces of skin that come from the fruit.

In the operation of the device, it will be understood that when it is desired to extract juice from fruit, the handle 14 will be moved to its retracted position shown in Fig. 2, and then the standard 37 together with the arm 33 and cup 30 attached to it will be mounted on the channels 20, as shown in this figure, and will be secured to the power unit by means of the set screw 43. Then the juice extracting bowl 16 will be placed upon the protuberance 15 and the reamer will be mounted in the bowl in operative engagement with the driving shaft 12. The fruit to be reamed will then be placed in the cup 30 while the cup is in its retracted position, and then the arm 33 will be grasped manually and moved downwardly so as to move the fruit into extracting relation with the reamer. After the fruit has been reamed, the arm 33 will be returned to its retracted position to provide for the removal of the fruit. A new piece of fruit may be placed in the cup and reamed in a similar manner.

When the juicing operations have been completed, the juicer bowl will be removed, and the standard 37 and arm 33 with the cup 30 attached may then be removed merely by unscrewing the set screw 43 and sliding the standard from the channels.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A juice extracting device comprising a power unit, a juice collecting bowl on said power unit, a juice extracting reamer rotatably mounted on a vertical axis within said bowl, a driving connection between said power unit and said reamer, a standard mounted on said power unit at one side of said bowl, a cup-shaped fruit holder arranged to hold a half orange and the like, a supporting arm for said fruit holder pivotally mounted on said standard so that it can be moved to carry the fruit holder over into said bowl to bring the fruit into extracting relation with said reamer, and so that it can be removed therefrom, a sliding connection between said power unit and said standard arranged so that the fruit holder can be slid into and out of its normal position on said power unit, and means holding said standard in its normal position, said means being releasable to permit said standard to be removed from the power unit.

2. A juice extracting device comprising a portable power unit having a supporting handle, means for moving said handle from its working position, a juice extracting member arranged to be fitted to said power unit in the space left by the handle when moved from the working position, a fruit holder to carry the fruit into extracting relation with said extracting member, and means detachably securing said fruit holder to said power unit.

3. A juice extracting device comprising a power unit, a juice collecting bowl on said power unit, a rotary reamer in said bowl driven by said power unit, a fruit holder, an operating arm attached to said fruit holder, a standard, means pivotally connecting said arm to said standard, a dove-tail connection between said standard and said power unit, and a set screw arranged to lock said standard to said power unit.

4. In combination, a power unit having a handle on its top, a juice collecting bowl arranged to be mounted on said top, the handle being movable to a retracted position to provide space for the bowl, a reamer in said bowl driven by said power unit, a fruit support, a standard for said fruit support arranged to be mounted on said top of said power unit between said bowl and handle in the space provided when the handle is in said retracted position, and means securing said standard to said power unit.

5. In combination, a power unit having a handle on top, a dove-tail connection between said handle and power unit providing for movement of said handle from its working to a retracted position, a juice collecting bowl arranged to be placed on top of said unit when said handle is in its retracted position, a rotary reamer in said bowl driven by said power unit, a cup-shaped fruit holder, an operating arm attached to said holder, a standard pivotally mounting said arm and arranged to be mounted on said top when said handle is in its retracted position and having a dove-tail connection with said power unit, and a set-screw for securing said standard to said power unit.

6. A juice extracting device comprising a power unit having spaced parallel flanges, a juice collecting bowl, a rotary reamer in said bowl driven by said power unit, a fruit holder, a standard supporting said fruit holder having a base with spaced apart grooves in it arranged to receive said flanges to secure said standard to said power unit and parts of said base engaging said flanges to limit the movement of said standard on said flanges and properly position said fruit holder with reference to said reamer.

ROBERT F. BEAN.